(12) United States Patent
Lu et al.

(10) Patent No.: US 12,601,335 B2
(45) Date of Patent: Apr. 14, 2026

(54) WATER RESISTANCE APPARATUS, PUMPING SYSTEM, PUMPING MACHINE, AND CLEANING METHOD

(71) Applicant: SANY AUTOMOBILE MANUFACTURING CO., LTD., Changsha (CN)

(72) Inventors: Zhixue Lu, Changsha (CN); Zhou Xu, Changsha (CN); Yonggang Wang, Changsha (CN)

(73) Assignee: SANY AUTOMOBILE MANUFACTURING CO., LTD., Changsha (CN)

( * ) Notice: Subject to any disclaimer, the term of this patent is extended or adjusted under 35 U.S.C. 154(b) by 484 days.

(21) Appl. No.: 17/928,730

(22) PCT Filed: Jun. 25, 2021

(86) PCT No.: PCT/CN2021/102493
§ 371 (c)(1),
(2) Date: Nov. 30, 2022

(87) PCT Pub. No.: WO2022/068291
PCT Pub. Date: Apr. 7, 2022

(65) Prior Publication Data
US 2023/0272787 A1 Aug. 31, 2023

(30) Foreign Application Priority Data

Sep. 30, 2020 (CN) .......................... 202011063417.4
Sep. 30, 2020 (CN) .......................... 202022207546.8

(51) Int. Cl.
*F04B 9/10* (2006.01)
*B08B 9/032* (2006.01)
(Continued)

(52) U.S. Cl.
CPC ................ *F04B 9/10* (2013.01); *B08B 9/032* (2013.01); *F04B 15/02* (2013.01); *B08B 9/0321* (2013.01);
(Continued)

(58) Field of Classification Search
CPC ........ F04B 9/10; F04B 15/02; F16N 2210/16; F16N 1/00; F16J 15/002; F16J 15/40; F16J 15/56; B08B 9/032; B08B 9/0321
See application file for complete search history.

(56) References Cited

U.S. PATENT DOCUMENTS 3,216,651 A * 11/1965 King ...................... F16J 15/008
417/364
3,943,717 A * 3/1976 Schexnayder ......... F16J 15/004
277/513
(Continued)

FOREIGN PATENT DOCUMENTS

CN 2495856 Y 6/2002
CN 2506819 Y 8/2002
(Continued)

OTHER PUBLICATIONS

Raw Machine Translation of CN204164086 (U); Zhu et al.; "Water-proof oil-sealing hydraulic cylinder, pumping mechanism and concrete pump", Feb. 18, 2015.*
(Continued)

*Primary Examiner* — Essama Omgba
*Assistant Examiner* — Lilya Pekarskaya
(74) *Attorney, Agent, or Firm* — IPro, PLLC

(57) ABSTRACT
A water resistance apparatus used for an oil cylinder, the oil cylinder including a press cover (10) and a piston rod (20) passing within press cover (10), and the water resistance apparatus including: a fluid inlet (14), which is arranged on
(Continued)

the press cover (10); a fluid outlet (16), which is arranged on the press cover (10), the fluid outlet (16) and the fluid inlet (14) being in a staggered arrangement; a seal assembly (30), the seal assembly (30) being arranged between the press cover (10) and the piston rod (20); a fluid input assembly (40), the fluid input assembly (40) being connected with the fluid inlet (14); a fluid output assembly (70), the fluid output assembly (70) being connected with the fluid outlet (16). The fluid input assembly of the water resistance apparatus is able to perform cleaning on a pressure accommodating cavity as well as a hydraulic circuit and a valve connected with the pressure accommodating cavity, preventing the problem in current technology where an overflow element is unable to normally open or close due to a foreign substance within the pressure accommodating cavity clogging the overflow element of the fluid output assembly, and thus ensuring that sealed oil pressure is always established in the pressure accommodating cavity, allowing the seal assembly to normally operate, and consequently ensuring that a pumping operation can be carried out normally. Additionally, a pumping system which has the water resistance apparatus, a pumping machine, and a method of cleaning a pumping machine using the water resistance apparatus are disclosed.

6 Claims, 4 Drawing Sheets

(51) Int. Cl.

| | |
|---|---|
| *F04B 15/02* | (2006.01) |
| *F16J 15/00* | (2006.01) |
| *F16J 15/40* | (2006.01) |
| *F16J 15/56* | (2006.01) |
| *F16N 1/00* | (2006.01) |

(52) U.S. Cl.
CPC .............. *F16J 15/002* (2013.01); *F16J 15/40* (2013.01); *F16J 15/56* (2013.01); *F16N 1/00* (2013.01); *F16N 2210/16* (2013.01)

(56) References Cited

U.S. PATENT DOCUMENTS

| | | | | | |
|---|---|---|---|---|---|
| 4,206,928 | A | | 6/1980 | Asano | |
| 4,447,062 | A | | 5/1984 | Leicht | |
| 5,129,790 | A | | 7/1992 | Ohnuma et al. | |
| 5,209,495 | A | * | 5/1993 | Palmour | F04B 53/164 |
| | | | | | 277/926 |
| 2015/0337960 | A1 | * | 11/2015 | Hold | F16J 15/002 |
| | | | | | 92/172 |

FOREIGN PATENT DOCUMENTS

| | | | | | |
|---|---|---|---|---|---|
| CN | 201844012 | U | | 5/2011 | |
| CN | 201972998 | U | | 9/2011 | |
| CN | 102272492 | A | | 12/2011 | |
| CN | 103452953 | A | | 12/2013 | |
| CN | 204099330 | U | | 1/2015 | |
| CN | 104364567 | A | | 2/2015 | |
| CN | 204164086 | U | * | 2/2015 | |
| CN | 111306028 | A | * | 6/2020 | ............. F04B 15/02 |
| CN | 212455508 | U | | 2/2021 | |
| KR | 20190099878 | A | * | 8/2019 | ............... F17D 1/08 |
| WO | 2013182456 | A1 | | 12/2013 | |

OTHER PUBLICATIONS

Raw Machine Translation of CN111306028 (A); Peng et al.; "Maintaining method for concrete piston of concrete pump", Jun. 19, 2020.*
Raw Machine Translation of KR20190099878 (A); Suk et al. Integrated Pipe Pressure Control System for Multiple Pipeline, Aug. 18, 2019.*
Extended European Search Report for European Patent Application No. 21873953.0, mailed May 27, 2024, 11 pages.
First Examination Report for Indian Patent Application No. 202247076124, mailed Mar. 7, 2024, 6 pages.
CN 202011063417.4 first office action dated Dec. 6, 2024.
IN 202247076124 Hearing Notice dated Apr. 30, 2025.

* cited by examiner

WATER RESISTANCE APPARATUS, PUMPING SYSTEM, PUMPING MACHINE, AND CLEANING METHOD

This application claims priority to Chinese Patent Application No. 202011063417.4 filed with China National Intellectual Property Administration on Sep. 30, 2020 and entitled "Water Resistance Apparatus, Pumping System, Pumping Machine, and Cleaning Method", and claims priority to Chinese Patent Application No. 202022207546.8 filed with China National Intellectual Property Administration on Sep. 30, 2020 and entitled "Water Resistance Apparatus, Pumping System and Pumping Machine", the entire contents of which are herein incorporated by reference.

FIELD

The present disclosure relates to the technical field of water resistance in pumping systems, and particularly relates to a water resistance apparatus, a pumping system, a pumping machine and a cleaning method.

BACKGROUND

The water resistance apparatus in the prior art does not have a pre-cleaning function, i.e., before the pumping operation of a pumping system, the water resistance apparatus cannot accomplish the cleaning on a pressure accommodating cavity or a hydraulic circuit and a valve connected with the pressure accommodating cavity in the water resistance apparatus, and thus, a foreign substance such as an oil-water mixture deposited in the pressure accommodating cavity easily clogs the valve core of an overflow valve or stutters its action, which causes that the overflow valve is unable to normally open or close, and a seal cavity (pressure accommodating cavity) cannot establish pressure, thereby rendering the failure of the sealing of a piston rod, causing external moisture to be mixed with the hydraulic oil within the press cover of the water resistance apparatus, and thus causing the emulsification of the hydraulic oil.

SUMMARY

The present disclosure aims to solve at least one of the technical problems that exist in the prior art or the related art.

To this end, a purpose of the present disclosure proposes a water resistance apparatus.

Another purpose of the present disclosure proposes a pumping system.

Another purpose of the present disclosure proposes a pumping machine.

Another purpose of the present disclosure proposes a cleaning method.

In order to achieve the above purposes, the embodiments of the present disclosure propose a water resistance apparatus, wherein an oil cylinder comprises a press cover and a piston rod passing within the press cover, and the water resistance apparatus comprises: a fluid inlet, arranged in the press cover; a fluid outlet, arranged in the press cover, wherein the fluid outlet and the fluid inlet are in a staggered arrangement; a seal assembly, arranged between the press cover and the piston rod; a fluid input assembly, which is connected with the fluid inlet; and a fluid output assembly, which is connected with the fluid outlet, wherein a ring-shaped pressure accommodating cavity is formed among the seal assembly, the press cover and the piston rod; both the fluid inlet and the fluid outlet are connected with the pressure accommodating cavity; the fluid input assembly is used to supply a pressure oil for the pressure accommodating cavity; and the fluid output assembly is used to control the connection or disconnection of the pressure accommodating cavity with the outside world.

In the embodiment, since the fluid outlet and the fluid inlet are in a staggered arrangement, the pressure oil entering from the fluid inlet can circulate in the pressure accommodating cavity and then flow out of the fluid output assembly, and then the fluid input assembly can perform cleaning on the pressure accommodating cavity as well as a hydraulic circuit and a valve connected with the pressure accommodating cavity. Thus, it prevents the problem in current technology where an overflow element is unable to normally open or close due to a foreign substance within the pressure accommodating cavity clogging the overflow element of the fluid output assembly, and thus ensures that a sealing oil pressure is always established in the pressure accommodating cavity, and the seal assembly can normally operate, and the problem is also prevented that the piston rod brings external moisture into the hydraulic oil in the water resistance apparatus due to the failure of the sealing of the piston rod and then the emulsification of the hydraulic oil is rendered, and it is further ensured that the pumping operation can be carried out normally.

In addition, the water resistance apparatus in the above embodiment of the present disclosure can further comprise the following additional technical features.

In the above embodiment, the fluid input assembly comprises: an oil storage device; a fluid-supply pipeline, wherein an end of the fluid-supply pipeline is connected with a fluid inlet, and the other end of the fluid-supply pipeline is connected to the oil storage device; and a fluid-control valve group, wherein the fluid-control valve group is arranged in the fluid-supply pipeline and used for adjusting the fluid-supply pressure of the fluid-supply pipeline.

In the embodiment, the fluid-control valve group is used to adjust the fluid-supply pressure of the fluid-supply pipeline, i.e., the oil pressure entering the fluid inlet can be adjusted, and thus, a hydraulic oil with a relatively high pressure can be injected into the pressure accommodating cavity to perform cleaning on the pressure accommodating cavity as well as the hydraulic circuit and the valve connected with the pressure accommodating cavity, thus ensuring that a sealing oil pressure is always established in the pressure accommodating cavity, allowing the seal assembly to normally operate, preventing the problem that the piston rod brings external moisture into the hydraulic oil in the water resistance apparatus due to the failure of the sealing of the piston rod and then the emulsification of the hydraulic oil is rendered, and consequently ensuring carrying out normal pumping operation.

In any one of the above embodiments, the fluid-control valve group comprises: a reversing valve, wherein the reversing valve comprises a first connecting interface, a second connecting interface and a third connecting interface, and the reversing valve is connected to the fluid-supply pipeline via the first connecting interface and the second connecting interface; a connecting pipeline, wherein an end of the connecting pipeline is connected to the third connecting interface, the other end of the connecting pipeline is connected to the fluid-supply pipeline to form a connecting point, and the connecting point is positioned between the reversing valve and the fluid inlet; and a first pressure-reducing valve, wherein the first pressure-reducing valve is arranged in the fluid-supply pipeline, and is positioned between the second connecting interface and the connecting point.

In the embodiment, through performing a direction changing operation on the reversing valve, the hydraulic oil enters the pressure accommodating cavity from the connecting pipeline, and at the moment, the hydraulic oil does not pass the first pressure-reducing valve, and thus a hydraulic oil with a relatively high pressure can be injected into the pressure accommodating cavity to perform cleaning on the pressure accommodating cavity as well as the hydraulic circuit and the valve connected with the pressure accommodating cavity, thus ensuring that a sealing oil pressure is always established in the pressure accommodating cavity, allowing the seal assembly to normally operate, preventing the problem that the piston rod brings external moisture into the hydraulic oil in the water resistance apparatus due to the failure of the sealing of the piston rod and then the emulsification of the hydraulic oil is rendered, and consequently ensuring carrying out normal pumping operation.

In any one of the above embodiments, the fluid-control valve group further comprises a second pressure-reducing valve, the second pressure-reducing valve is arranged in the connecting pipeline, and the preset pressure value of the second pressure-reducing valve is higher than the preset pressure value of the first pressure-reducing valve.

In the embodiment, through performing a direction changing operation on the reversing valve, the hydraulic oil enters the pressure accommodating cavity from the second pressure-reducing valve, and at the moment, the hydraulic oil does not pass the first pressure-reducing valve, and thus a hydraulic oil with a relatively high pressure can be injected into the pressure accommodating cavity to perform cleaning on the pressure accommodating cavity as well as the hydraulic circuit and the valve connected with the pressure accommodating cavity, thus ensuring that a sealing oil pressure is always established in the pressure accommodating cavity, allowing the seal assembly to normally operate, preventing the problem that the piston rod brings external moisture into the hydraulic oil in the water resistance apparatus due to the failure of the sealing of the piston rod and then the emulsification of the hydraulic oil is rendered, and consequently ensuring carrying out normal pumping operation. In addition, the arrangement of the second pressure-reducing valve can adjust the fluid-supply pressure of the connecting pipeline, and can effectively prevent the problem that the connecting pipeline is damaged as the fluid-supply pressure of the connecting pipeline is too high, and meanwhile ensure that the water resistance apparatus has a relatively good cleaning effect on the pressure accommodating cavity as well as a hydraulic circuit and a valve connected with the pressure accommodating cavity.

In any one of the above embodiments, the fluid-control valve group comprises: a first pressure-reducing valve, arranged in the fluid-supply pipeline; an on-off valve and a connecting pipeline, wherein the on-off valve is arranged in the connecting pipeline, and the on-off valve and the first pressure-reducing valve are connected in parallel in the fluid-supply pipeline via the connecting pipeline; or the fluid-control valve group comprises a pilot-type pressure-reducing valve, and the pilot-type pressure-reducing valve is arranged in the fluid-supply pipeline.

In the embodiment, through performing operation on the on-off valve, the hydraulic oil enters the pressure accommodating cavity from the connecting pipeline, and at the moment, the hydraulic oil does not pass the first pressure-reducing valve, and thus a hydraulic oil with a relatively high pressure can be injected into the pressure accommodating cavity to perform cleaning on the pressure accommodating cavity as well as the hydraulic circuit and the valve connected with the pressure accommodating cavity, thus ensuring that a sealing oil pressure is always established in the pressure accommodating cavity, allowing the seal assembly to operate normally, preventing the problem that the piston rod brings external moisture into the hydraulic oil in the water resistance apparatus due to the failure of the sealing of the piston rod and then the emulsification of the hydraulic oil is rendered, and consequently ensuring that a pumping operation can be carried out normally. The hydraulic oil with a relatively high pressure stored in the oil storage device is injected into the pressure accommodating cavity via the pilot-type pressure-reducing valve, to perform cleaning on the pressure accommodating cavity as well as the hydraulic circuit and the valve connected with the pressure accommodating cavity, thus ensuring that a sealing oil pressure is always established in the pressure accommodating cavity, allowing the seal assembly to normally operate, preventing the problem that the piston rod brings external moisture into the hydraulic oil in the water resistance apparatus due to the failure of the sealing of the piston rod and then the emulsification of the hydraulic oil is rendered, and consequently ensuring that a pumping operation can be carried out normally.

In any one of the above embodiments, the fluid input assembly further comprises: a stop valve, arranged in the fluid-supply pipe line and positioned between the oil storage device and the fluid-control valve group; an accumulator, arranged in the fluid-supply pipeline and positioned between the oil storage device and the stop valve; and a first one-way valve, wherein the first one-way valve is arranged in the fluid-supply pipeline and positioned between the fluid-control valve group and the fluid inlet, and the first one-way valve is conducted unidirectionally along the fluid-supply direction of the fluid-supply pipeline.

In the embodiment, the stop valve has a function of stopping an oil stream, and according to actual circumstances, the stop valve can be opened or closed to communicate or close the accumulator and the reversing valve, thereby satisfying the requirements for controlling the fluid input assembly. The accumulator can supply a stable oil pressure for the fluid-supply pipeline; when it is necessary to perform cleaning on the pressure accommodating cavity as well as the hydraulic circuit and the valve connected with the pressure accommodating cavity, the accumulator can stably supply a relatively high oil pressure for the fluid-supply pipeline, thereby ensuring that the cleaning can be performed normally, and further ensuring that the pumping operation can be performed normally. In addition, the first one-way valve has a one-way circulation function, and the pressure oil in the fluid-supply pipeline can only flow towards the fluid-supply direction, and this prevents affecting the normal work of the fluid input assembly as the pressure oil in a fluid return pipeline flows back to the fluid-supply pipeline.

In any one of the above embodiments, the fluid output assembly comprises: a fluid return pipeline, wherein an end of the fluid return pipeline is connected with the fluid outlet; an overflow valve, wherein the overflow valve is disposed in the fluid return pipeline, and the preset pressure value of the overflow valve is lower than the preset pressure value of the second pressure-reducing valve of the fluid input assembly, and higher than the preset pressure value of the first pressure-reducing valve of the fluid input assembly; and a second one-way valve, wherein the second one-way valve is disposed in the fluid return pipeline and positioned between the fluid outlet and the overflow valve, and the second one-way valve is conducted unidirectionally along the fluid return direction of the fluid return pipeline.

In the embodiment, the second one-way valve has a one-way circulation function, and this renders that the hydraulic oil in the fluid return pipeline can only flow towards an oil return direction, and then prevents affecting the normal working of the fluid output assembly as an external foreign substance enters the pressure accommodating cavity reversely when the overflow valve is clogged or blocked, and further ensures the normal working of the water resistance apparatus. The preset pressure value of the overflow valve is set to be lower than the preset pressure value of the second pressure-reducing valve, and thus, during a washing operation, the overflow valve will overflow, thereby ensuring the cleaning effect of the water resistance apparatus on the pressure accommodating cavity as well as a hydraulic circuit and a valve connected with the pressure accommodating cavity. The preset pressure value of the overflow valve is set to be higher than the preset pressure value of the first pressure-reducing valve, and thus, during a pumping operation, the overflow valve will not overflow, thereby ensuring that the water resistance apparatus is able to work normally.

In any one of the above embodiments, the fluid input assembly reversing valve is an electromagnetic reversing valve fluid input assembly, or a zero-leakage electromagnetic d reversing valve fluid input assembly, or a manual three-way ball valve fluid input assembly.

In the embodiment, the electromagnetic reversing valve is an executing electric device commonly used in the electric control field, and has the features of simple structure, high reliability and high performance-price ratio, and this is convenient for later replacement and maintenance of the reversing valve, thereby reducing the costs of production and maintenance of the water resistance apparatus. The zero-leakage electromagnetic reversing valve has the features of simple structure, high reliability and high performance-price ratio, and meanwhile has a relatively strong leak-proof function, i.e., the zero-leakage electromagnetic reversing valve is disposed with two one-way valves with respect to a traditional electromagnetic reversing valve, and this ensures that the hydraulic oil in the zero-leakage electromagnetic reversing valve can only flow towards a preset direction, and further ensures the reliability and stability of the working of the zero-leakage electromagnetic reversing valve. The manual three-way ball valve has the features of simple structure and high performance-price ratio, and meanwhile has a relatively high reliability, i.e., with respect to the electromagnetic reversing valve, manual direction change can be conducted to the manual three-way ball valve directly, which does not require circuit control, and thus, the manual three-way ball valve has higher reliability.

The embodiment of the second aspect of the present disclosure proposes a pumping system, and the pumping system comprises: a conveying cylinder; a main oil cylinder, wherein the main oil cylinder is provided with the water resistance apparatus according to any one of the embodiments in the first aspect; a piston rod of the main oil cylinder is connected to a piston rod of the conveying cylinder, and the piston rod of the main oil cylinder is used to drive the piston rod within the conveying cylinder to move, and the water resistance apparatus is arranged at an end of the main oil cylinder near the conveying cylinder.

As the pumping system proposed in the embodiment of the second aspect of the present disclosure comprises the water resistance apparatus in any one of the embodiments of the first aspect, the pumping system has all the beneficial effects that any one of the above embodiments have, which is not repeated herein.

In the above embodiment, since the pumping system comprises the water resistance apparatus, the pumping system in the present disclosure has the function of performing cleaning on the pressure accommodating cavity as well as the hydraulic circuit and the valve connected with the pressure accommodating cavity, and this prevents the problem in the prior art that the piston rod brings external moisture into the hydraulic oil in the water resistance apparatus due to the failure of the sealing of the piston rod and then the emulsification of the hydraulic oil is rendered, and consequently ensures that the pumping operation can be carried out normally.

The embodiment of the third aspect of the present disclosure further proposes a pumping machine, including the water resistance apparatus according to any one of the embodiments of the first aspect, or the above pumping system.

In the above embodiment, since the pumping machine comprises the water resistance apparatus or the pumping system, the pumping machine in the present disclosure has the function of performing cleaning on the pressure accommodating cavity as well as the hydraulic circuit and the valve connected with the pressure accommodating cavity, and this prevents the problem in the prior art that the piston rod brings external moisture into the hydraulic oil in the water resistance apparatus due to the failure of the sealing of the piston rod and then the emulsification of the hydraulic oil is rendered, and consequently ensures that the pumping operation can be carried out normally.

The embodiment of the fourth aspect of the present disclosure proposes a cleaning method, and the cleaning method is used for the pumping machine in any one of the embodiments of the third aspect; the cleaning method comprises: step S10, before the operation of the pumping machine, the fluid input assembly is opened to supply a pressure oil for the pressure accommodating cavity and the fluid output assembly is controlled and the pressure accommodating cavity is conducted with the outside world.

As the cleaning method proposed in the embodiment of the fourth aspect of the present disclosure comprises the pumping machine in any one of the embodiments of the third aspect, the cleaning method has all the beneficial effects that any one of the above embodiments have, which is not repeated herein.

In the above embodiment, through the above step S10, cleaning on the pressure accommodating cavity as well as the hydraulic circuit and the valve connected with the pressure accommodating cavity can be performed, and therefore, this prevents the problem in the prior art where an overflow element is unable to normally open or close due to a foreign substance within the pressure accommodating cavity clogging the overflow element of the fluid output assembly, thus ensures that a sealing oil pressure is always established in the pressure accommodating cavity, allows the seal assembly to normally operate, prevents the problem that the piston rod brings external moisture into the hydraulic oil in the water resistance apparatus due to the failure of sealing of the piston rod and then the emulsification of the hydraulic oil is rendered, and consequently ensures that the pumping operation can be carried out normally.

Additional aspects and advantages of the present disclosure will become apparent in the following description, or are understood by the practice of the present disclosure.

BRIEF DESCRIPTION OF THE DRAWINGS

The above and/or additional aspects and advantages of the present disclosure will be obvious and understood easily from the following description of the embodiments in combination with the accompanying drawings. Wherein.

The corresponding relationships between the reference signs and component names in FIG. 1 to FIG. 8 are as follows:

10: press cover, 14: fluid inlet, 16: fluid outlet, 20: piston rod, 30: seal assembly, 32: lip-shaped packing, 34: dust ring, 40: fluid input assembly, 41: oil storage device, 42: fluid-supply pipeline, 44: fluid-control valve group, 4411: electromagnetic reversing valve, 4412: first connecting interface, 4413: zero-leakage electromagnetic reversing valve, 4414: second connecting interface, 4415: manual three-way ball valve, 4416: third connecting interface, 442: connecting pipeline, 444: first pressure-reducing valve, 446: second pressure-reducing valve, 448: on-off valve, 449: pilot-type pressure-reducing valve, 46: stop valve, 48: accumulator, 49: first one-way valve, 70: fluid output assembly, 72: fluid return pipeline, 74: overflow valve, 76: second one-way valve, 50: pressure accommodating cavity, and 60: connecting point.

DETAILED DESCRIPTION OF THE DISCLOSURE

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

Figure 1:
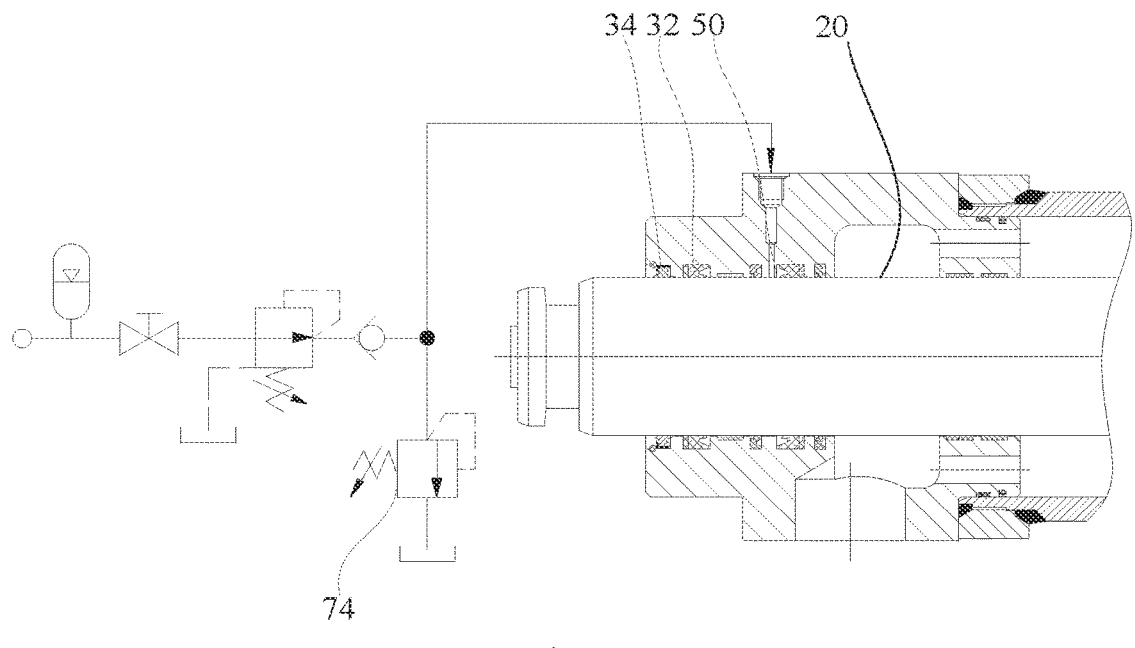
FIG. 1 is a schematic structural diagram of a water resistance apparatus in the prior art.

It should be explained that a pumping mechanism is the core part of a concrete delivery pump, and through the reciprocating movement of the piston rod of a hydraulic cylinder, a delivery cylinder and a concrete piston are driven to realize continuous operation of concrete sucking and pumping. Ina working process, the piston rod of the hydraulic cylinder is immersed in a washing chamber and plays the role of cleaning, cooling and lubricating. When the piston rod of the hydraulic cylinder retracts, it easily brings water in the washing chamber into hydraulic oil, thereby resulting in emulsification and deterioration of the hydraulic oil. As shown in FIG. 1, currently, a piston rod seal device is generally used, that is, a set of lip-shaped packings 32 with opposite lips are used to form a pressure accommodating cavity 50 to seal oil, and a set of dust rings 34 are used to block the invasion of external pollutants. Under the action of a pressure oil, the lip-shaped packings 32 are closely attached to a piston rod 20, when the piston rod 20 reciprocates, an oil film and a water film attached to the piston rod 20 are scraped off by the packings and enter the pressure accommodating cavity 50, the pressure in the pressure accommodating cavity 50 increases continuously, when the pressure rises to the set pressure of an overflow valve 74, the overflow valve 74 opens, and an oil-water mixture in the pressure accommodating cavity 50 overflows to the washing chamber through the overflow valve 74. Due to the extremely harsh working environment of the pumping apparatus, the washing chamber comprises a large amount of sediment mixture, impurities such as sediment are attached to the surface of the piston rod 20 immersed in the washing chamber, and the dust rings 34 cannot completely scrape or squeeze it; these sediment impurities attached to the surface of the piston rod 20 will enter the pressure accommodating cavity 50 under the scraping and squeezing of the lip-shaped packings 32, so the oil-water mixture scraped and squeezed from the pressure accommodating cavity contains a lot of foreign substances; these mixtures are deposited in the pressure accommodating cavity 50, when the pressure accommodating cavity 50 reaches an overflow pressure, the overflow valve 74 overflows, the foreign substances easily clog the valve core of overflow valve 74 directly or stutter its action, thus rendering that the overflow valve 74 is unable to normally open or close, and a seal cavity cannot establish pressure, which leads to an excessive discharge of the system, and even renders the failure of the sealing of the piston rod 20 and consequently results in the emulsification of the hydraulic oil of the system.

As shown in FIG. 1, the water resistance apparatus in the prior art does not have a pre-washing function of the system, the oil-water mixed substance deposited in the pressure accommodating cavity 50 can only overflow when the pressure accommodating cavity 50 slowly reaches the set pressure of the overflow valve 74 and opens, which easily causes the clogging of the valve core of the overflow valve 74, and renders the failure of the water resistance apparatus. The clogging of the valve core of the overflow valve 74 is the biggest factor which renders the failure of the sealing for water resistance.

A water resistance apparatus according to some embodiments of the present disclosure is described below with reference to FIG. 2 to FIG. 8.

As shown in FIG. 2 to FIG. 8, the present disclosure and the embodiments of the present disclosure propose a water resistance apparatus used for an oil cylinder, wherein the oil cylinder comprises a press cover 10 and a piston rod 20 passing within the press cover 10, and the water resistance apparatus comprises: a fluid inlet 14, a fluid outlet 16, a seal assembly 30, a fluid input assembly 40 and a fluid output assembly 70. Wherein, the fluid inlet 14 is arranged in the press cover 10; the fluid outlet 16 is arranged in the press cover 10, and the fluid outlet 16 and the fluid inlet 14 are in a staggered arrangement; the seal assembly 30 is arranged between the press cover and the piston rod 20; the fluid input assembly 40 is connected with the fluid inlet 14; and the fluid output assembly 70 is connected with the fluid outlet 16. A ring-shaped pressure accommodating cavity 50 is formed among the seal assembly 30, the press cover 10 and the piston rod 20; both the fluid inlet 14 and the fluid outlet 16 are connected with the pressure accommodating cavity 50; the fluid input assembly 40 is used to supply a pressure oil for the pressure accommodating cavity 50; and the fluid output assembly 70 is used to control the connection or disconnection of the pressure accommodating cavity 50 with the outside world.

In the above arrangement, since the fluid outlet 16 and the fluid inlet 14 are in a staggered arrangement, the pressure oil entering from the fluid inlet 14 can circulate in the pressure accommodating cavity 50 and then flow out of the fluid output assembly 70 (by controlling the connection or disconnection of the pressure accommodating cavity 50 with the outside world), and then the fluid input assembly 40 can perform cleaning on the pressure accommodating cavity 50 as well as a hydraulic circuit and a valve connected with the pressure accommodating cavity 50. Thus, it prevents the problem in current technology where an overflow element is unable to normally open or close due to a foreign substance within the pressure accommodating cavity 50 clogging the overflow element of the fluid output assembly 70, and thus ensures that a sealing oil pressure is always established in the pressure accommodating cavity, and the seal assembly 30 can normally operate, and the problem is also prevented that the piston rod brings external moisture into the hydraulic oil in the water resistance apparatus due to the failure of the sealing of the piston rod and then the emulsification of the hydraulic oil is rendered, and it is further ensured that pumping operation can be carried out normally.

It needs to be explained that the water resistance apparatus in the present disclosure has a cleaning function for the pressure accommodating cavity 50; the fluid input assembly 40 injects a hydraulic oil with a relatively high pressure into the pressure accommodating cavity 50 to perform a high-pressure cleaning on the entire water resistance apparatus, to remove the foreign substances deposited in the hydraulic circuit, the valve and the pressure accommodating cavity 50, thereby preventing the problem where the overflow element is unable to normally open or close as the valve core of the overflow element is clogged or blocked by the foreign substances during the pumping operation. The above overflow element refers to the overflow valve 74 in the present disclosure.

Embodiment 1

Figure 2:
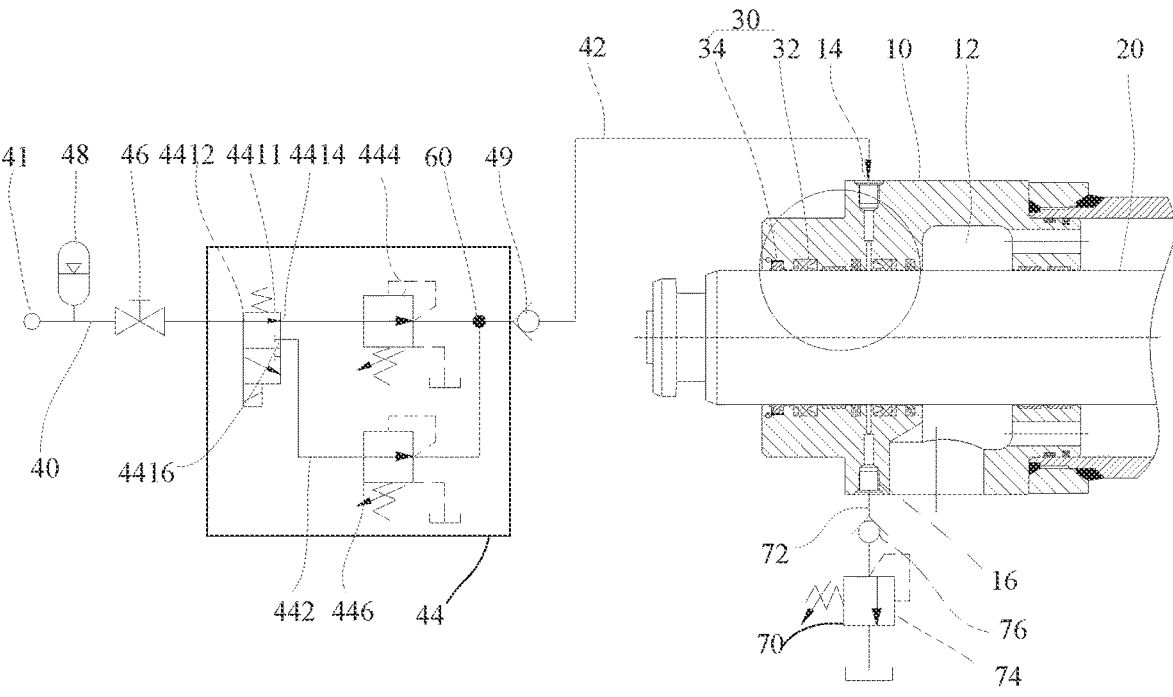
FIG. 2 is a schematic structural diagram of a water resistance apparatus according to Embodiment 1 of the present disclosure.
Figure 3:
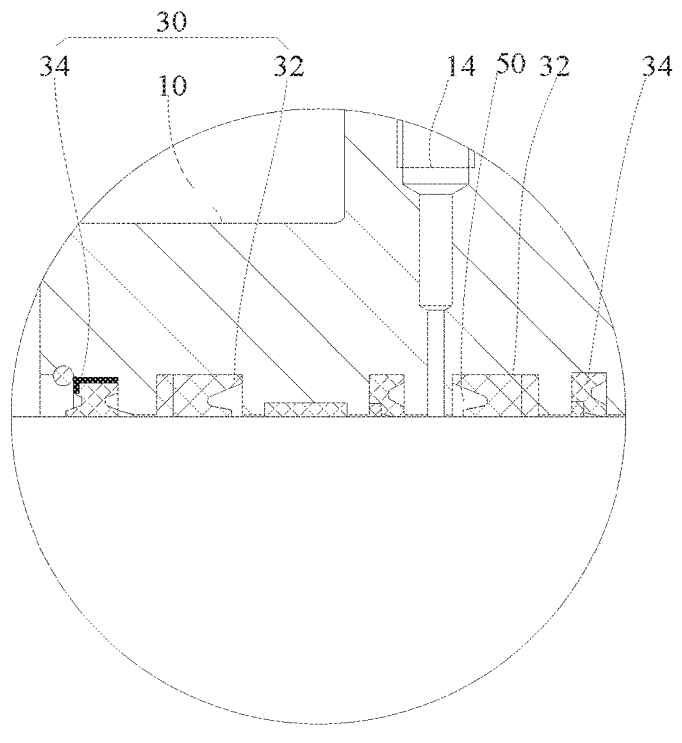
FIG. 3 is a partial enlarged diagram of the water resistance apparatus in FIG. 2.

There are many kinds of methods for controlling the connection or disconnection of the pressure accommodating cavity 50 with the outside world, as shown in FIG. 2 and FIG. 3, in Embodiment 1 of the present disclosure, the fluid input assembly comprises an oil storage device 41, a fluid-supply pipeline 42 and a fluid-control valve group 44. Wherein, an end of the fluid-supply pipeline 42 is connected with a fluid inlet 14, and the other end of the fluid-supply pipeline 42 is connected to the oil storage device 41; the fluid-control valve group 44 is arranged in the fluid-supply pipeline 42 and used for adjusting the fluid-supply pressure of the fluid-supply pipeline 42; the fluid output assembly 70 comprises a fluid return pipeline 72, an overflow valve 74 and a second one-way valve 76, wherein an end of the fluid return pipeline 72 is connected with the fluid outlet 16, and the overflow valve 74 is arranged in the fluid return pipeline 72.

In the above arrangement, the fluid-control valve group 44 is used to adjust the fluid-supply pressure of the fluid-supply pipeline, i.e., the oil pressure entering the fluid inlet 14 can be adjusted, and thus, the hydraulic oil with a relatively high pressure can be injected into the pressure accommodating cavity 50, and the overflow valve 74 opens and an overflow is generated, thereby performing cleaning on the pressure accommodating cavity 50 as well as the hydraulic circuit and the valve connected with the pressure accommodating cavity 50, thus ensuring that a sealing oil pressure is always established in the pressure accommodating cavity 50, allowing the seal assembly 30 to normally operate, preventing the problem that the piston rod brings external moisture into the hydraulic oil in the water resistance apparatus due to the failure of the sealing of the piston rod and then the emulsification of the hydraulic oil is rendered, and consequently ensuring carrying out normal pumping operation.

As shown in FIG. 2 and FIG. 3, in Embodiment 1 of the present disclosure, the fluid-control valve group 44 comprises a reversing valve, a connecting pipeline 442 and a first pressure-reducing valve 444. Wherein, the reversing valve comprises a first connecting interface 4412, a second connecting interface 4414 and a third connecting interface 4416, and the reversing valve is connected to the fluid-supply pipeline 42 via the first connecting interface 4412 and the second connecting interface 4414. An end of the connecting pipeline 442 is connected to the third connecting interface 4416, the other end of the connecting pipeline 442 is connected to the fluid-supply pipeline 42 to form a connecting point 60, and the connecting point 60 is positioned between the reversing valve and the fluid inlet 14. The first pressure-reducing valve 444 is arranged in the fluid-supply pipeline 42, and is positioned between the second connecting interface 4414 and the connecting point 60.

In the above arrangement, the fluid-control valve group 44 is used to adjust the fluid-supply pressure of the fluid-supply pipeline, i.e., the oil pressure entering the fluid inlet 14 can be adjusted, and thus, a hydraulic oil with a relatively high pressure can be injected into the pressure accommodating cavity 50, and the overflow valve 74 opens and an overflow is generated, thereby performing cleaning on the pressure accommodating cavity 50 as well as the hydraulic circuit and the valve connected with the pressure accommodating cavity 50, thus ensuring that sealing oil pressure is always established in the pressure accommodating cavity 50, allowing the seal assembly 30 to normally operate, preventing the problem that the piston rod 20 brings external moisture into the hydraulic oil in the water resistance apparatus due to the failure of the sealing of the piston rod 20 and then the emulsification of the hydraulic oil is rendered, and consequently ensuring carrying out normal pumping operation.

As shown in FIG. 2 and FIG. 3, in Embodiment 1 of the present disclosure, the fluid-control valve group 44 further comprises a second pressure-reducing valve 446, the second pressure-reducing valve 446 is arranged in the connecting pipeline 442, and the preset pressure value of the second pressure-reducing valve 446 is higher than the preset pressure value of the first pressure-reducing valve 444.

In the above arrangement, through performing a direction changing operation on the reversing valve, the hydraulic oil enters the pressure accommodating cavity 50 from the second pressure-reducing valve 446, and at the moment, the hydraulic oil does not pass the first pressure-reducing valve 444, and thus the hydraulic oil with a relatively high pressure can be injected into the pressure accommodating cavity 50, and the overflow valve 74 opens and an overflow is generated, thereby performing cleaning on the pressure accommodating cavity 50 as well as the hydraulic circuit and the valve connected with the pressure accommodating cavity 50, thus ensuring that a sealing oil pressure is always established in the pressure accommodating cavity 50, allowing the seal assembly 30 to normally operate, preventing the problem that the piston rod 20 brings external moisture into the hydraulic oil in the water resistance apparatus due to the failure of the sealing of the piston rod and then the emulsification of the hydraulic oil is rendered, and consequently ensuring carrying out normal pumping operation. In addition, the arrangement of the second pressure-reducing valve 446 can adjust the fluid-supply pressure of the connecting pipeline 442, and can effectively prevent the problem that the connecting pipeline 442 is damaged as the fluid-supply pressure of the connecting pipeline 442 is too high, and meanwhile ensure that the water resistance apparatus has a relatively good cleaning effect on the pressure accommodating cavity 50 as a hydraulic circuit and a valve connected with the pressure accommodating cavity 50.

It needs to be explained that the water resistance apparatus works normally when the pumping system operates normally, the hydraulic pressure enters the pressure accommodating cavity 50 from the first pressure-reducing valve 444, and the set pressure value of the first pressure-reducing valve 444 is lower than the overflow pressure of the overflow valve 74, and this ensures that the pressure accommodating cavity 50 can keep pressure, the seal assembly 30 of the water resistance apparatus can normally seal the piston rod 20, thereby ensuring that the water resistance apparatus is able to work normally. Before the pumping system operates normally, it is necessary to perform cleaning on the pressure accommodating cavity 50 as well as the hydraulic circuit and the valve connected with the pressure accommodating cavity 50; through performing a direction changing operation on the reversing valve, the hydraulic oil enters the pressure accommodating cavity 50 from the second pressure-reducing valve 446, the set pressure value of the second pressure-reducing valve 446 is higher than the overflow pressure of the overflow valve 74, and this ensures that the overflow valve 74 opens, and the foreign substance such as oil-water mixture deposited in the pressure accommodating cavity 50 can be discharged along with an oil stream through the overflow valve 74, thereby achieving the self-cleaning function of the water resistance apparatus.

As shown in FIG. 2 and FIG. 3, in Embodiment 1 of the present disclosure, the fluid input assembly 40 further comprises a stop valve 46, an accumulator 48 and a first one-way valve 49. Wherein, the stop valve 46 is arranged in the fluid-supply pipeline 42, and the stop valve 46 is positioned between the oil storage device 41 and the fluid-control valve group 44. The accumulator 48 is arranged in the fluid-supply pipeline 42, and the accumulator 48 is positioned between the oil storage device 41 and the stop valve 46; the first one-way valve 49 is arranged in the fluid-supply pipeline 42 and positioned between the fluid-control valve group 44 and the fluid inlet 14, and the first one-way valve 49 is conducted unidirectionally along the fluid-supply direction of the fluid-supply pipeline 42.

In the above arrangement, the stop valve 46 has a function of stopping the oil stream, and according to actual circumstances, the stop valve 46 can be opened or closed to communicate or close the accumulator 48 and the reversing valve, thereby satisfying the requirements for controlling the fluid input assembly 40. The accumulator 48 can supply a stable oil pressure for the fluid-supply pipeline; when it is necessary to perform cleaning on the pressure accommodating cavity 50 as well as the hydraulic circuit and the valve connected with the pressure accommodating cavity 50, the accumulator 48 can stably supply a relatively high oil pressure for the fluid-supply pipeline, thereby ensuring that the cleaning can be performed normally, and further ensuring that the pumping operation can be performed normally. In addition, the first one-way valve 49 has a one-way circulation function, and the pressure oil in the fluid-supply pipeline can only flow towards the fluid-supply direction, and this prevents affecting the normal work of the fluid input assembly 40 as the pressure oil in a fluid return pipeline flows back to the fluid-supply pipeline.

As shown in FIG. 2 and FIG. 3, in Embodiment 1 of the present disclosure, the fluid output assembly 70 comprises a fluid return pipeline 72, an overflow valve 74 and a second one-way valve 76. Wherein, an end of the fluid return pipeline 72 is connected with the fluid outlet 16. The overflow valve 74 is disposed in the fluid return pipeline 72, and the preset pressure value of the overflow valve 74 is lower than the preset pressure value of the second pressure-reducing valve 446 of the fluid input assembly 40, and higher than the preset pressure value of the first pressure-reducing valve 444 of the fluid input assembly 40. The second one-way valve 76 is disposed in the fluid return pipeline 72 and positioned between the fluid outlet 16 and the overflow valve 74, and the second one-way valve 76 is conducted unidirectionally along the fluid return direction of the fluid return pipeline 72.

In the above arrangement, the second one-way valve 76 has a one-way circulation function, and this renders that the hydraulic oil in the fluid return pipeline can only flow towards an oil return direction, and then prevents affecting the normal working of the fluid output assembly as a foreign substance enters the pressure accommodating cavity 50 reversely when the overflow valve is clogged or blocked, and further ensures the normal working of the water resistance apparatus. The preset pressure value of the overflow valve 74 is set to be lower than the preset pressure value of the second pressure-reducing valve 446, and thus, during a washing operation, the overflow valve 74 will overflow, thereby ensuring the cleaning effect of the water resistance apparatus on the pressure accommodating cavity 50 as well as a hydraulic circuit and a valve connected with the pressure accommodating cavity 50. The preset pressure value of the overflow valve 74 is set to be higher than the preset pressure value of the first pressure-reducing valve 444, and thus, during a pumping operation, the overflow valve 74 will not overflow, thereby ensuring that the water resistance apparatus is able to work normally.

It needs to be explained that the oil storage device 41 stores a hydraulic oil with a relatively high pressure therein, and the oil pressures of the hydraulic oil within the oil storage device 41 and the accumulator 48 are higher than the preset pressures of the first pressure-reducing valve 444 and the second pressure-reducing valve 446 and the overflow pressure of the overflow valve 74.

Specifically, as shown in FIG. 2, in Embodiment 1 of the present disclosure, the reversing valve is an electromagnetic reversing valve 4411. In the above arrangement, the electromagnetic reversing valve 4411 is an executing electric device commonly used in the electric control field, and has the features of simple structure, high reliability and high performance-price ratio, and this is convenient for later replacement and maintenance of the reversing valve, thereby reducing the costs of production and maintenance of the water resistance apparatus.

Specifically, as shown in FIG. 2 and FIG. 3, in Embodiment 1 of the present disclosure, the seal assembly 30 comprises two lip-shaped packings 32 disposed opposite to each other, and the fluid inlet 14 and the fluid outlet 16 are positioned between the two lip-shaped packings 32.

In the above arrangement, under the action of the oil pressure, the lip-shaped packings 32 are deformed, the lip-shaped portions of the lip-shaped packings 32 open, and the lip-shaped packings 32 are in interference fit with the peripheral surface of the piston rod 20 and the inner wall surface of the press cover 10, and thus the lip-shaped packings 32 are completely attached to the peripheral surface of the piston rod 20 and the inner wall surface of the press cover 10, thereby preventing the external moisture from entering the inner cavity of the press cover 10, preventing the problem of the emulsification and deterioration of the hydraulic oil due to the mixing of the moisture with the hydraulic oil within the inner cavity, and thus further ensuring that the water resistance apparatus can work normally. In addition, the fluid inlet 14 is arranged between the two lip-shaped packings 32 which are disposed opposite to each other, and the lip-shaped portions of the lip-shaped packings 32 orient the flowing direction of the hydraulic oil, and then this is convenient for the lip-shaped portions to open quickly, thereby ensuring the stability and reliability of the sealing of the seal assembly 30, and further ensuring that the water resistance apparatus can work normally; and arranging the fluid outlet 16 between two lip-shaped packings 32 which are disposed opposite to each other helps the pressure relief of the pressure accommodating cavity 50 and the discharge of a foreign substance such as an oil-water mixture.

Specifically, as shown in FIG. 2 and FIG. 3, in Embodiment 1 of the present disclosure, the seal assembly 30 comprises two dust rings 34, and the two lip-shaped packings 32 are arranged between the two dust rings 34. In the above arrangement, the dust rings 34 can prevent external pollutants from entering the inner cavity of the press cover 10 and then prevent polluting the hydraulic oil, thereby ensuring that the water resistance apparatus can work normally.

The working process of the water resistance apparatus in Embodiment 1 is described hereinafter:

before the pumping operation, a cleaning mode is selected, the electromagnetic reversing valve 4411 gains electricity, the second pressure-reducing valve 446 is accessed to an oil passage, the hydraulic oil with a relatively high pressure passes through the second pressure-reducing valve 446 and enters the pressure accommodating cavity 50; since the set pressure of the second pressure-reducing valve 446 is higher than the overflow pressure of the overflow valve 74, the overflow valve 74 opens, the foreign substance such as an oil-water mixture deposited in the pressure accommodating cavity 50 can overflow directly through the overflow valve 74, and thus this has the function of cleaning on the pressure accommodating cavity 50 as well as the hydraulic circuit and the valve connected with the pressure accommodating cavity 50.

During the pumping operation, a pumping mode is switched, the electromagnetic reversing valve 4411 loses electricity, the first pressure-reducing valve 444 is accessed to the oil passage, the hydraulic oil with a relatively high pressure passes through the first pressure-reducing valve 444 and enters the pressure accommodating cavity 50; since the set pressure of the first pressure-reducing valve 444 is lower than the overflow pressure of the overflow valve 74, the overflow valve 74 closes temporarily; when the piston rod 20 reciprocates, the pressure of the pressure accommodating cavity 50 will rise slowly under the action of the oil scraping of the lip-shaped packings 32, when the pressure reaches the overflow pressure, the overflow valve 74 opens again.

Embodiment 2

Figure 4:
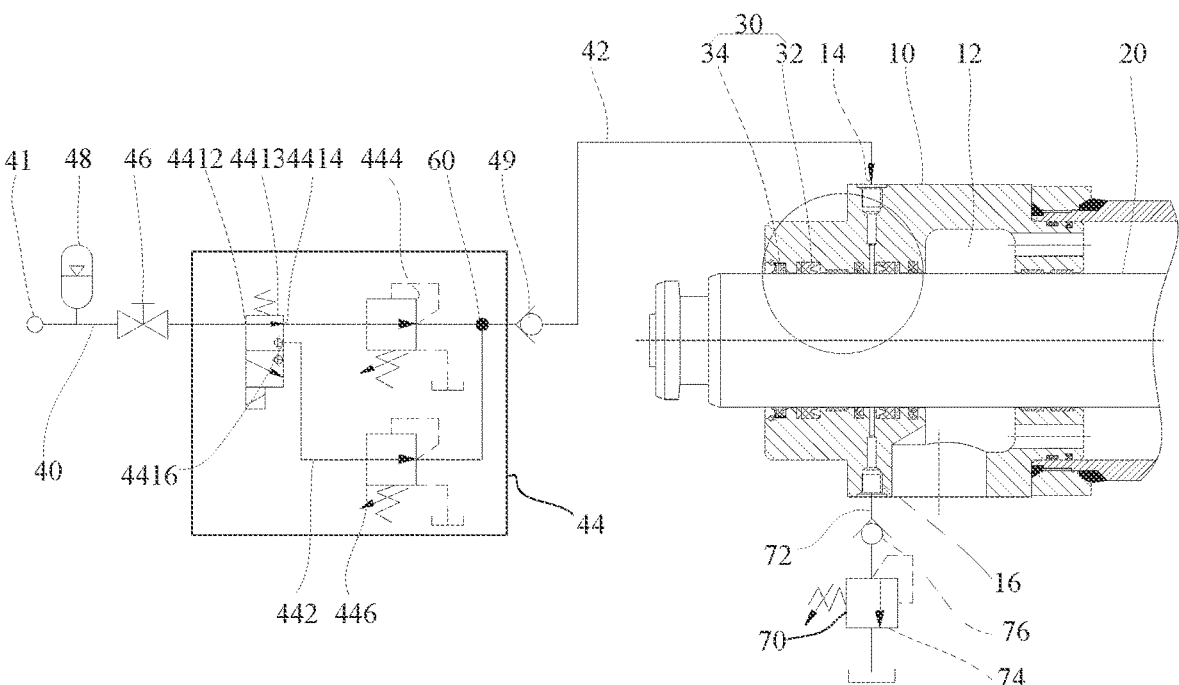
FIG. 4 is a schematic structural diagram of a water resistance apparatus according to Embodiment 2 of the present disclosure.

A distinction between Embodiment 2 and Embodiment 1 is provided as follows:

as shown in FIG. 4, in Embodiment 2 of the present disclosure, the reversing valve is a zero-leakage electromagnetic reversing valve 4413.

In the above arrangement, the zero-leakage electromagnetic reversing valve 4413 has the features of simple structure, high reliability and high performance-price ratio, and meanwhile has a relatively strong leak-proof function, i.e., the zero-leakage electromagnetic reversing valve 4413 is disposed with two one-way valves with respect to a traditional electromagnetic reversing valve, and this ensures that the hydraulic oil in the zero-leakage electromagnetic reversing valve can only flow towards a preset direction, and further ensures the reliability and stability of the working of the zero-leakage electromagnetic reversing valve.

The remaining structures of Embodiment 1 and Embodiment 2 are the same, and are not repeated herein.

Embodiment 3

Figure 5:
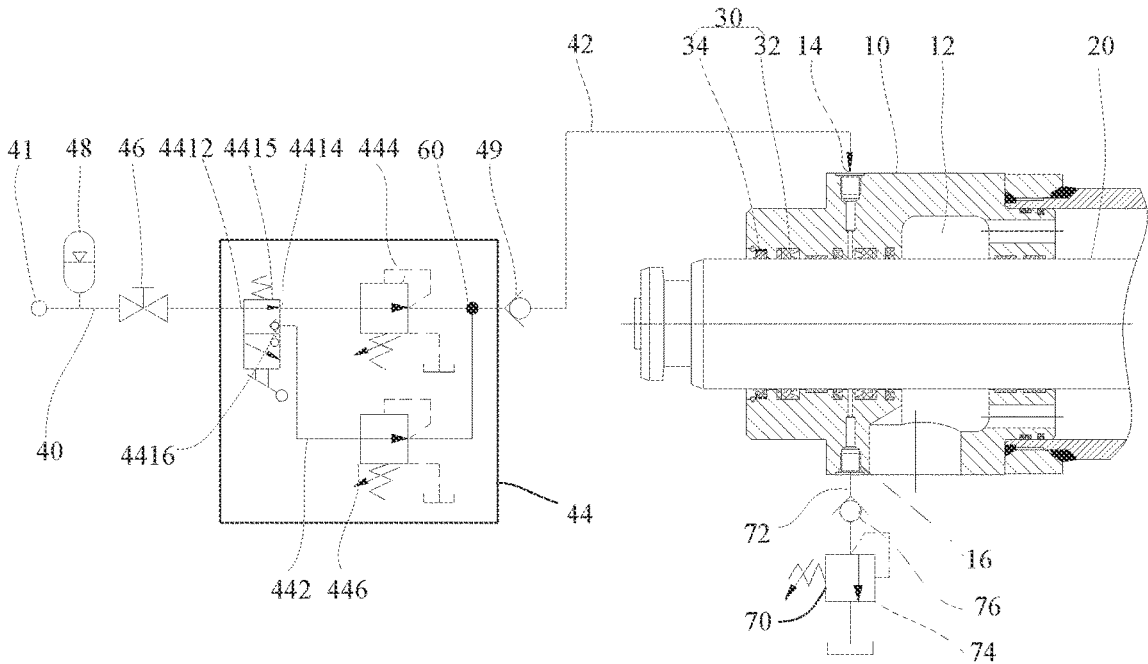
FIG. 5 is a schematic structural diagram of a water resistance apparatus according to Embodiment 3 of the present disclosure.

A distinction between Embodiment 3 and Embodiment 1 is provided as follows:

as shown in FIG. 5, in Embodiment 3 of the present disclosure, the reversing valve is a manual three-way ball valve 4415. In the above arrangement, the manual three-way ball valve 4415 has the features of simple structure and high performance-price ratio, and meanwhile has a relatively high reliability, i.e., with respect to the electromagnetic reversing valve, manual direction change can be conducted to the manual three-way ball valve 4415 directly, which does not require circuit control, and thus, the manual three-way ball valve 4415 has higher reliability.

The remaining structures of Embodiment 3 and Embodiment 1 are the same, and are not repeated herein.

Embodiment 4

Figure 6:
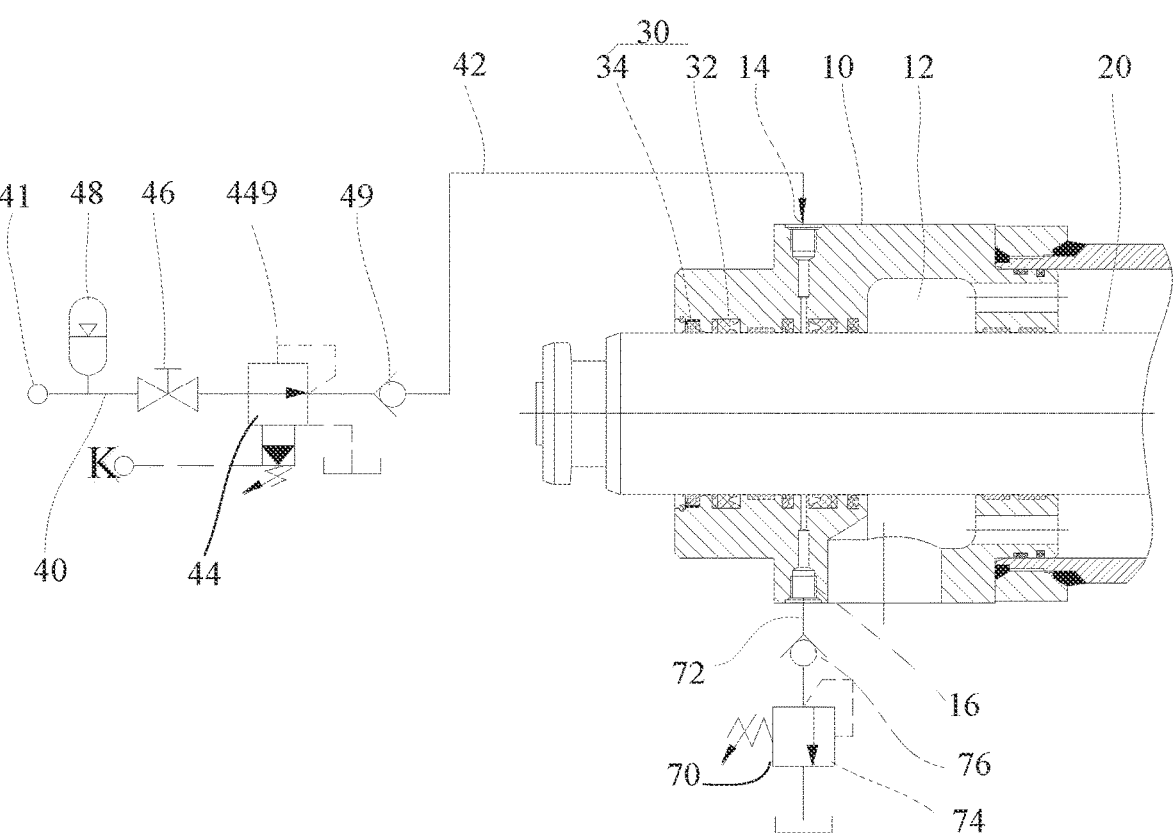
FIG. 6 is a schematic structural diagram of a water resistance apparatus according to Embodiment 4 of the present disclosure.

A distinction between Embodiment 4 and Embodiment 1 is provided as follows:

as shown in FIG. 6, in Embodiment 4 of the present disclosure, the fluid-control valve group 44 comprises a pilot-type pressure-reducing valve 449, and the pilot-type pressure-reducing valve 449 is arranged in the fluid-supply pipeline 42.

In the above arrangement, the hydraulic oil is injected into the pressure accommodating cavity 50 via the pilot-type pressure-reducing valve 449, to perform cleaning on the pressure accommodating cavity 50 as well as the hydraulic circuit and the valve connected with the pressure accommodating cavity 50, thus ensuring that a sealing oil pressure is always established in the pressure accommodating cavity 50, allowing the seal assembly 30 to normally operate, preventing the problem that the piston rod 20 brings external moisture into the hydraulic oil in the water resistance apparatus due to the failure of the sealing of the piston rod 20 and then the emulsification of the hydraulic oil is rendered, and consequently ensuring that a pumping operation can be carried out normally.

It needs to be explained that the pilot-type pressure-reducing valve 449 comprises a control oil circuit K, and the pressure of the pilot-type pressure-reducing valve 449 can be set through the control oil circuit K. During the pumping operation, the pressure of the pilot-type pressure-reducing valve 449 is set to be lower than the overflow pressure of the overflow valve 74; during the cleaning operation, the pressure of the pilot-type pressure-reducing valve 449 is set to be higher than the overflow pressure of the overflow valve 74. Thus, the pressure of the pilot-type pressure-reducing valve 449 is set using the control oil circuit K, thereby achieving a self-cleaning function of the water resistance apparatus.

The remaining structures of Embodiment 4 and Embodiment 1 are the same, and are not repeated herein.

Embodiment 5

Figure 7:
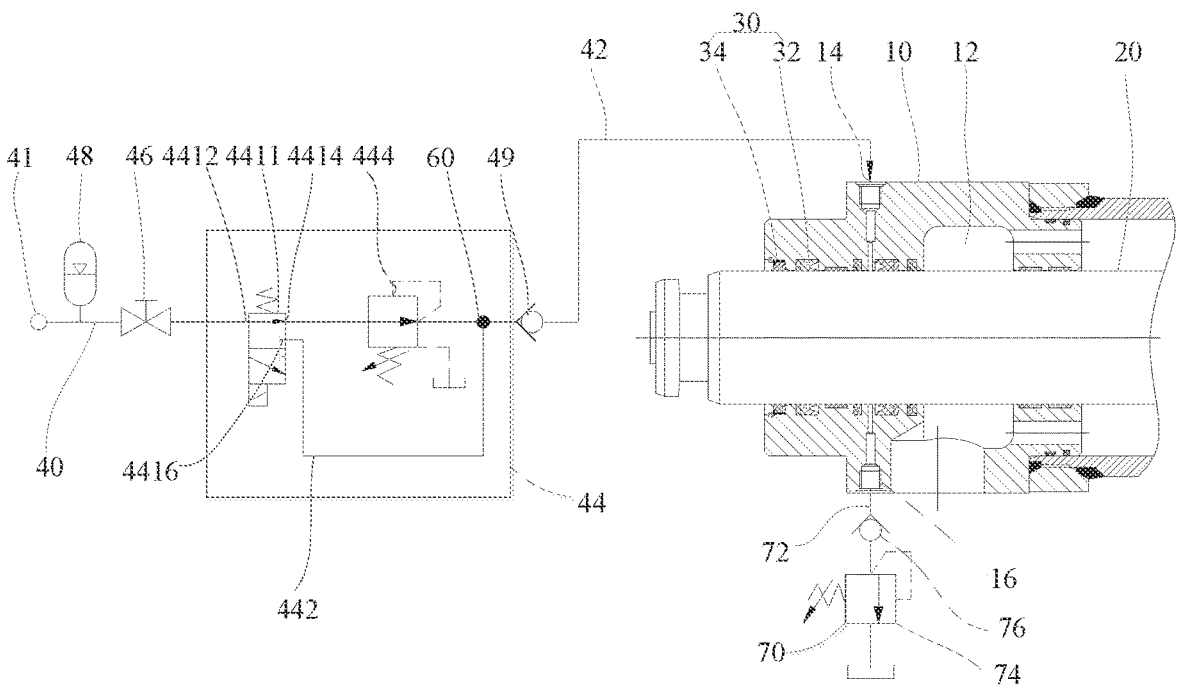
FIG. 7 is a schematic structural diagram of a water resistance apparatus according to Embodiment 5 of the present disclosure.

A distinction between Embodiment 5 and Embodiment 1 is provided as follows:

as shown in FIG. 7, in Embodiment 5 of the present disclosure, the fluid-control valve group 44 does not comprise the second pressure-reducing valve 446.

The remaining structures of Embodiment 5 and Embodiment 1 are the same, and they will not be repeated herein.

Embodiment 6

Figure 8:
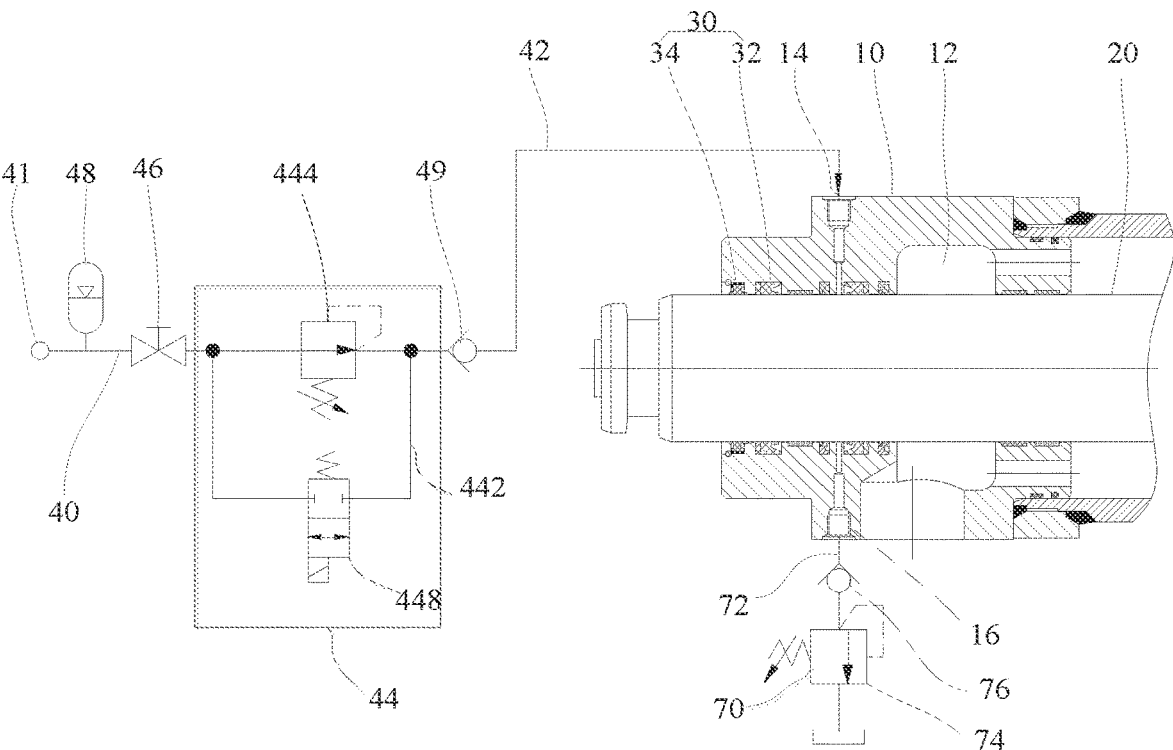
FIG. 8 is a schematic structural diagram of a water resistance apparatus according to Embodiment 6 of the present disclosure.

A distinction between Embodiment 6 and Embodiment 1 is provided as follows:

As shown in FIG. 8, in Embodiment 6 of the present disclosure, the fluid-control valve group 44 comprises a first pressure-reducing valve 444, an on-off valve 448 and a connecting pipeline 442. The first pressure-reducing valve 444 is arranged in the fluid-supply pipeline 42. The on-off valve 448 is arranged in the connecting pipeline 442, and the on-off valve 448 and the first pressure-reducing valve 444 are connected in parallel in the fluid-supply pipeline 42 via the connecting pipeline 442.

In the above arrangement, through performing operation on the on-off valve 448, the hydraulic oil enters the pressure accommodating cavity 50 from the connecting pipeline, and at the moment, the hydraulic oil does not pass the first pressure-reducing valve 444, and thus a hydraulic oil with a relatively high pressure can be injected into the pressure accommodating cavity 50 to perform cleaning on the pressure accommodating cavity 50 as well as the hydraulic circuit and the valve connected with the pressure accommodating cavity 50, thus ensuring that a sealing oil pressure is always established in the pressure accommodating cavity 50, allowing the seal assembly 30 to operate normally, preventing the problem that the piston rod 20 brings external moisture into the hydraulic oil in the water resistance apparatus due to the failure of the sealing of the piston rod 20 and then the emulsification of the hydraulic oil is rendered, and consequently ensuring that a pumping operation can be carried out normally.

The water resistance apparatus in the present disclosure has the following advantages:

1. the reversing valve is adopted to achieve the switching of the oil circuit, and this is convenient for changing the direction;
2. the cleaning function is provided, the deposited foreign substance can be washed away using the high-pressure oil, and the cleaning degree of the hydraulic system is improved;

3. The clogging of the valve core of the overflow valve 74 is effectively prevented, the reliability of the working of the water resistance apparatus is improved, and the probability of leakage and emulsification of the hydraulic oil caused by the clogging of the valve core is reduced;
4. the second one-way valve 76 is added, which can prevent the foreign substance in the washing chamber from entering the pressure accommodating cavity reversely when the overflow valve 74 is clogged or blocked; and
5. the pressure of the pilot-type pressure-reducing valve 449, or the pressures of the first pressure-reducing valve 444 and the second pressure-reducing valve 446 can be set according to the actual needs, to achieve the switching of the cleaning mode and the pumping mode.

The present disclosure further proposes a pumping system, and the pumping system comprises: a conveying cylinder; a main oil cylinder, wherein the main oil cylinder is provided with the water resistance apparatus used for the oil cylinder according to any one of the embodiments in the first aspect; the piston rod of the main oil cylinder is connected to the piston rod of the conveying cylinder, and the piston rod of the main oil cylinder is used to drive the piston rod 20 within the conveying cylinder to move, and the water resistance apparatus is arranged at an end of the main oil cylinder near the conveying cylinder.

In the above arrangement, since the pumping system comprises the water resistance apparatus, the pumping system in the present disclosure has the function of performing cleaning on the pressure accommodating cavity 50 as well as the hydraulic circuit and the valve connected with the pressure accommodating cavity 50, and this prevents the problem in the prior art that the piston rod 20 brings external moisture into the hydraulic oil in the water resistance apparatus due to the failure of the sealing of the piston rod 20 and then the emulsification of the hydraulic oil is rendered, and consequently ensures that the pumping operation can be carried out normally.

As the pumping system proposed in the embodiment of the second aspect of the present disclosure comprises the water resistance apparatus according to any one of the embodiments of the first aspect, the pumping system has all the beneficial effects that any one of the above embodiments have, which is not repeated herein.

The present disclosure further proposes a pumping machine, including the water resistance apparatus according to any one of the embodiments of the first aspect, or the above pumping system.

In the above arrangement, since the pumping machine comprises the water resistance apparatus or the pumping system, the pumping machine in the present disclosure has the function of performing cleaning on the pressure accommodating cavity as well as the hydraulic circuit and the valve connected with the pressure accommodating cavity, and this prevents the problem in the prior art that the piston rod brings external moisture into the hydraulic oil in the water resistance apparatus due to the failure of the sealing of the piston rod and then the emulsification of the hydraulic oil is rendered, and consequently ensures that the pumping operation can be carried out normally.

The present disclosure further proposes a cleaning method used for the self-cleaning of the pumping system; the cleaning method performs the cleaning using the above pumping machine, and the cleaning method comprises step S10 for performing cleaning on the pressure accommodating cavity 50 using the fluid input assembly 40.

Specifically, step S10 of the cleaning in Embodiment 1 to Embodiment 3 comprises:

S01: setting the pressure value of the second pressure-reducing valve 446;

S03: supplying power to the reversing valve;

S05: injecting the hydraulic oil into the pressure accommodating cavity 50 to perform cleaning;

S07: the overflow valve 74 automatically opening, conducting overflowing and discharging the foreign substance.

Specifically, step S10 of the cleaning in Embodiment 4 comprises:

S02: setting the pressure value of the pilot-type pressure-reducing valve 449;

S04: injecting the hydraulic oil into the pressure accommodating cavity 50 to perform cleaning; and

S06: the overflow valve 74 automatically opening, conducting overflowing and discharging the foreign substance.

Specifically, step S10 of the cleaning in Embodiment 5 comprises:

S11: supplying power to the reversing valve;

S13: injecting the hydraulic oil into the pressure accommodating cavity 50 to perform cleaning; and

S15: the overflow valve 74 automatically opening, conducting overflowing and discharging the foreign substance.

Specifically, step S10 of the cleaning in Embodiment 4 comprises:

S12: starting the on-off valve 448;

S14: injecting the hydraulic oil into the pressure accommodating cavity 50 to perform cleaning; and

S16: the overflow valve 74 automatically opening, conducting overflowing and discharging the foreign substance.

From the above description, it can be seen that the fluid input assembly 40 can perform cleaning on the pressure accommodating cavity 50 as well as the hydraulic circuit and the valve connected with the pressure accommodating cavity 50, and therefore, this prevents the problem in the prior art where an overflow element is unable to normally open or close due to a foreign substance within the pressure accommodating cavity 50 clogging the overflow element of the fluid output assembly 70, thus ensures that a sealing oil pressure is always established in the pressure accommodating cavity, allows the seal assembly 30 to normally operate, prevents the problem that the piston rod brings external moisture into the hydraulic oil in the water resistance apparatus due to the failure of the sealing of the piston rod and then the emulsification of the hydraulic oil is rendered, and consequently ensures that the pumping operation can be carried out normally.

In the description of the present specification, the terms "first", "second" and "third" are used for the purpose of description only, and cannot be understood as indicating or implying relative importance, the term of "multiple" refers to two or more, unless otherwise explicitly specified or defined. The terms of "mounting", "connected to", "connected with", "fix" and the like should be understood in a broad sense, for example, the term "connect with" can be a fixed connection, a detachable connection, or an integral connection; the term "connected to" can be a direct connection or an indirect connection through an intermediate medium. For a person skilled in the art, they may understand the specific meanings of the above-mentioned terms in the present disclosure according to specific circumstances.

In the description of the present specification, it needs to be understood that the orientation or position relations indicated by the terms of "upper", "lower", "left", "right", "front", "rear" and the like are based on the orientation or position relations shown in the accompanying drawings, and they are just intended to conveniently describe the present application and simplify the description, and are not intended to indicate or imply that the devices or units as indicated should have specific orientations or should be configured or operated in specific orientations, and then should not be construed as limitations to the present application.

In the description of the present specification, the descriptions of "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the particular features, structures, materials or characteristics described may be combined in a suitable manner in any one or more embodiments or examples.

The descriptions above are only preferred embodiments of the present disclosure, which are not used to limit the present disclosure. For a person skilled in the art, the present disclosure may have various changes and variations. Any modifications, equivalent substitutions, improvements etc. within the spirit and principle of the present disclosure shall all be included in the protection scope of the present disclosure.

What is claimed is:

1. A water resistance apparatus for an oil cylinder, the oil cylinder comprises a press cover and a piston rod passing within the press cover, wherein the water resistance apparatus comprises:

a fluid inlet, arranged in the press cover;

a fluid outlet, arranged in the press cover, wherein the fluid outlet and the fluid inlet are in a staggered arrangement;

a seal assembly, arranged between the press cover and the piston rod;

a fluid input assembly, which is connected with the fluid inlet; and a fluid output assembly, which is connected with the fluid outlet;

wherein a ring-shaped pressure accommodating cavity is formed among the seal assembly, the press cover and the piston rod; both the fluid inlet and the fluid outlet are connected with the ring-shaped pressure accommodating cavity; the fluid input assembly is used to supply a pressure oil for the ring-shaped pressure accommodating cavity; and the fluid output assembly is used to control a connection or disconnection of the ring-shaped pressure accommodating cavity with the outside world;

wherein the fluid input assembly comprises:

an oil storage device;

a fluid-supply pipeline, wherein an end of the fluid-supply pipeline is connected with the fluid inlet, and the other end of the fluid-supply pipeline is connected to the oil storage device; and a fluid-control valve group, wherein the fluid-control valve group is arranged in the fluid-supply pipeline and used for adjusting a fluid-supply pressure of the fluid-supply pipeline;

wherein the fluid-control valve group comprises:

a reversing valve, wherein the reversing valve comprises a first connecting interface, a second connecting interface and a third connecting interface, and the reversing valve is connected to the fluid-supply pipeline via the first connecting interface and the second connecting interface;

a connecting pipeline, wherein an end of the connecting pipeline is connected with the third connecting interface, the other end of the connecting pipeline is connected with the fluid-supply pipeline to form a connecting point, and the connecting point is positioned between the reversing valve and the fluid inlet; and a first pressure-reducing valve, wherein the first pressure-reducing valve is arranged in the fluid-supply pipeline, and is positioned between the second connecting interface and the connecting point.

2. The water resistance apparatus according to claim 1, wherein the fluid-control valve group further comprises a second pressure-reducing valve, the second pressure-reducing valve is arranged in the connecting pipeline, and a preset pressure value of the second pressure-reducing valve is higher than a preset pressure value of the first pressure-reducing valve.

3. The water resistance apparatus according to claim 1, wherein the fluid-control valve group comprises:

the first pressure-reducing valve, an on-off valve that is arranged in the connecting pipeline, wherein the on-off valve and the first pressure-reducing valve are connected in parallel in the fluid-supply pipeline via the connecting pipeline; or the fluid-control valve group comprises a pilot-type pressure-reducing valve, and the pilot-type pressure-reducing valve is arranged in the fluid-supply pipeline.

4. The water resistance apparatus according to claim 1, wherein the fluid output assembly comprises:

a fluid return pipeline, wherein an end of the fluid return pipeline is connected with the fluid outlet;

an overflow valve, wherein the overflow valve is disposed in the fluid return pipeline, and a preset pressure value of the overflow valve is lower than a preset pressure value of a second pressure-reducing valve of the fluid input assembly, and higher than a preset pressure value of the first pressure-reducing valve of the fluid input assembly; and a second one-way valve, wherein the second one-way valve is disposed in the fluid return pipeline and positioned between the fluid outlet and the overflow valve, and the second one-way valve is conducted unidirectionally along a the fluid return direction of the fluid return pipeline.

5. A pumping machine, comprising the water resistance apparatus according to claim 1.

6. A method for operating the pumping machine according to claim 5, comprising:

opening the fluid input assembly to supply a pressure oil for the pressure accommodating cavity, and venting the pressure accommodating cavity using the fluid output assembly.

* * * * *